(12) United States Patent
Kawecki et al.

(10) Patent No.: US 11,226,021 B2
(45) Date of Patent: Jan. 18, 2022

(54) THREE-DIMENSIONAL PRINTED DISC BRAKE ROTOR

(71) Applicants: Michael J. Kawecki, Frederick, CO (US); Ryan S. Wood, Broomfield, CO (US)

(72) Inventors: Michael J. Kawecki, Frederick, CO (US); Ryan S. Wood, Broomfield, CO (US)

( * ) Notice: Subject to any disclaimer, the term of this patent is extended or adjusted under 35 U.S.C. 154(b) by 107 days.

(21) Appl. No.: 16/741,494

(22) Filed: Jan. 13, 2020

(65) Prior Publication Data
US 2020/0224739 A1    Jul. 16, 2020

Related U.S. Application Data

(60) Provisional application No. 62/917,996, filed on Jan. 11, 2019.

(51) Int. Cl.
*F16D 65/12* (2006.01)
*F16D 65/02* (2006.01)

(52) U.S. Cl.
CPC ......... *F16D 65/128* (2013.01); *F16D 65/125* (2013.01); *F16D 2065/1328* (2013.01)

(58) Field of Classification Search
CPC .................. F16D 65/123–128; F16D 65/12
USPC ............. 188/18 A, 218 XL, 264 A, 264 AA
See application file for complete search history.

(56) References Cited

U.S. PATENT DOCUMENTS

| | | | |
|---|---|---|---|
| 5,542,503 A * | 8/1996 | Dunn | F16D 65/128 188/18 A |
| 7,703,583 B2 * | 4/2010 | Oberti | F16D 65/128 188/218 XL |
| 9,574,629 B2 | 2/2017 | Gutierrez et al. | |
| 10,697,509 B2 * | 6/2020 | Trivedi | B29C 64/40 |
| 2007/0199778 A1 * | 8/2007 | Lee | F16D 65/12 188/218 XL |
| 2008/0135359 A1 | 6/2008 | Basirico et al. | |
| 2012/0079916 A1 | 4/2012 | Al-Qutub et al. | |
| 2018/0209498 A1 * | 7/2018 | Zandbergen | F16D 65/123 |
| 2019/0360541 A1 * | 11/2019 | Bellardi | B33Y 80/00 |

(Continued)

FOREIGN PATENT DOCUMENTS

| | | | |
|---|---|---|---|
| EP | 2128477 A1 | 5/2009 | |
| EP | 2469117 B1 | 12/2015 | |
| EP | 3184845 B1 | 6/2016 | |

(Continued)

*Primary Examiner* — Christopher P Schwartz
(74) *Attorney, Agent, or Firm* — Russell Manning; FisherBroyles, LLP (57) ABSTRACT

Ventilated disc brake rotors are presented that have significantly increased surface areas for cooling in comparison with currently manufactured disc brake rotors. In an embodiment, the rotors utilize a matric of cooling channels disposed between opposing outside surfaces of friction rings of the rotors. The plurality of cooling channels may be in the form of a three-dimensional lattice or matrix (e.g., repeating or stacked rows of cooling channels). When utilizing such a lattice or matrix, at least a portion of the cooling channels do not directly interface with either friction ring. Rather, at least a portion of the cooling channels interface with (e.g., are surrounded by) other cooling channels. As a result, the total cooling surface area of the rotor may be greatly increased compared to existing rotors.

17 Claims, 12 Drawing Sheets

(56) References Cited

U.S. PATENT DOCUMENTS

2020/0132146 A1\* 4/2020 Zhang ................... F16D 65/124
2020/0362928 A1\* 11/2020 Meckel ................. C23C 14/028

FOREIGN PATENT DOCUMENTS

GB          2543020 A     4/2017
WO     2017194280 A1    11/2017

\* cited by examiner

THREE-DIMENSIONAL PRINTED DISC BRAKE ROTOR

CROSS REFERENCE

The present application claims the benefit of the filing date of U.S. Provisional Application No. 62/917,996 having a filing date of Jan. 11, 2019, the entire contents of which is incorporated herein by reference.

FIELD

The present disclosure relates to disc brake rotors. More specifically, the present disclosure is directed to a lightweight high-performance disc brake rotor.

BACKGROUND

Disc brakes are utilized with a majority of vehicles. Braking system utilizing disc brakes include friction rings on either the front wheels or all wheels of a vehicle. Each friction ring is attached to and rotates with its respective wheel. During braking, the friction ring is gripped by caliper-operated brake pads converting kinetic energy of a moving vehicle into heat. This results in the brake disc becoming hot during use, which can result in reduced braking efficiency (i.e., brake fade) if the brake discs become excessively hot.

To enhance heat dissipation from the brake disc, most brake discs or 'rotors' are ventilated. That is, the rotors have each have two spaced friction rings with an air-gap there between. Air may pass through this air-gap to assist in heat dissipation/cooling. Most commonly, the two annular friction rings are joined by vanes or pillars that extend between facing surfaces (e.g., inside surfaces) of the two friction rings. When utilizing vanes, the vanes may be straight extending radially outward or may be curved (e.g., spirally). Other shapes are known. When utilizing pillars, a plurality of individual pillars may extend between the friction discs in various configuration. Spaces between the vanes or pillars define air or cooling channels through which cooling air may pass to assist in removing heat from the friction rings.

The typical process of forming disc brake rotors involves casting gray iron in a process where a resin-impregnated sand mold in the form of the cooling channels is disposed in a rotor mold prior to casting. The sand mold is located at a position that will be between the friction rings after casting. Once the disc rotor is cast and cooled, the sand mold between the friction rings is removed (i.e., destroyed) leaving open cooling channels between the friction rings. This process, while long utilized and effective, limits the geometry of the cooling channels to what can be produced in a sand mold.

SUMMARY

Aspects of the presented disclosure are based, in part, on the realization that prior processes for producing ventilated brake rotor discs is a limiting factor in the amount of available surface area for cooling. That is, casting processes limit the geometry and size of what can be manufactured thereby limiting the potential geometries that can be formed between the friction rings. Along these lines, it has been recognized that advanced three-dimensional (3D) metal printing processes (e.g., direct metal laser sintering, laser powder bed fusion, electron beam melting, etc.) allow for creating more intricate brake rotor cooling channel designs that can greatly increase available surface area for cooling. Further aspects of the present disclosure are based, in part, on the realization that lightweight, high-temperature materials are available for use in 3D printing. Further, such materials may result in brake rotors that meet or exceed performance standards of existing high-performance rotors while significantly reducing the unsprung weight and rotational mass of a vehicle.

In an arrangement, a brake rotor is provided having first and second friction rings having a common axis of rotation. The friction rings each have a generally planar outer surface (e.g., annular surface). These outer surfaces are disposed in parallel planes that are substantially perpendicular to and spaced along the common axis of rotation. Extending through edges surfaces of the brake rotor (e.g., between the planar outer surfaces) are a plurality of cooling channels, which may be termed a matrix of cooling channels. In an arrangement, the plurality of cooling channels (e.g., matrix of cooling channels) include first and second sets of outer cooling channels disposed adjacent to the friction rings (e.g. adjacent to inside surfaces and/or outer surfaces of the friction rings). These cooling channels are disposed about the periphery of the rotor. The cooling channels also include a set of inner cooling channel disposed between the two sets of outer cooling channels. Typically, the inner cooling channels are separated from the friction rings by the outer cooling channels. Heat is transferred to the inner cooling channels through a lattice or matrix of sidewalls forming the cooling channels. However, the inclusion of the inner cooling channels provides significantly increased surface area for cooling The inner and outer cooling channels define openings that extend between an inside periphery and an outside periphery of the rotor. In one arrangement, these opening are generally disposed in a plane that is perpendicular to the common axis of the rotor. In an arrangement, the openings or paths are non-linear (e.g., curved). In an arrangement, the cooling channels may be identical. In another arrangement, cross-section shapes and or sized (e.g., cross-dimensions) may be varied. For instance, different rows of the cooling channels may have different physical characteristics (e.g., sizes shapes).

In another arrangement, a brake rotor is provided having first and second friction rings having a common axis of rotation. The friction rings each have a generally planar outer surface (e.g., annular surface). These outer surfaces are disposed in parallel planes that are substantially perpendicular to and spaced along the common axis of rotation. Extending between inside surfaces of the brake rotors are a plurality of tear-drop shaped pillars. The tear-drop shapes pillars may be formed in concentric rows. In such an arrangement, the pillars of each common row may be swept at a common angle to direct airflow outward to provide a centrifugal effect.

In any arrangement, the disclosed ventilated rotor may provide improved heat transfer via additive manufacturing by creating a 3D printed aluminum metal matrix brake rotor. This allows 2-3× reduction in mass (over cast-iron), improved rotor life, less dust and noise—all with equal stopping performance. Such a rotor may improve miles per gallon (MPG), reduce brake dust pollution and/or provide unsprung weight reduction.

The rotor designs create better heat dissipation via more heat transfer surface area and in various arrangements enhanced airflow. When utilizing a metal matrix composite (MMC) formed of aluminum and ceramic, a resulting bake rotor may achieve enhanced thermal conductivity. For instance, when utilizing a MMC made of Aluminum and 5-25% ceramic powder, a brake rotor may have approximately five times the thermal conductivity of an original equipment manufacturer (e.g., cast iron) rotor. The increased surface area and/or material selection results in a rotor that removes more heat out of the rotor much faster than cast-iron or even carbon fiber.

DETAILED DESCRIPTION

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

Presented herein are ventilated disc brake rotors (hereafter 'rotor' or 'rotors') having significantly increased surface areas in comparison with currently manufactured disc brake rotors. The increased surface area enhances the cooling efficiency of the rotors. In an embodiment, the rotors have an increased plurality of cooling channels between the inside surfaces of opposing friction rings. In such an embodiment, the plurality of cooling channels may be in the form of a three-dimensional lattice or matrix (e.g., repeating rows of cooling channels). When utilizing such a lattice or matrix, at least a portion of the cooling channels do not directly interface with an inside surface of either friction ring. Rather, at least a portion of the cooling channels interface with (e.g., are surrounded by) other cooling channels. That is, a portion of the cooling channels are interior channels physically separated from inside surfaces of the friction rings. While separated from the inside surfaces of the friction discs, the sidewalls of the interior channels form a lattice/matrix that effectively conducts heat from the friction discs to each channel. As a result, the total cooling surface area of the rotor may be greatly increased compared to existing rotors. In an embodiment, the rotors are formed in a three-dimensional (3D) printing process. In a further embodiment, the rotors are formed of a lightweight aluminum and ceramic material. In such an embodiment, the mass of the rotor may be reduced to approximately one-third to one-half of a similarly sized rotor formed of cast iron. In a further embodiment, the rotor may be formed with a plurality of tear drop shaped pillars between the friction rings. The tear-drop shaped pillars reduce the turbulence of flow between rings improving overall flow. An increased density of the tear dropped shaped pillars increases the overall surface area of the rotor thereby improving the overall cooling of the rotor.

Figure 1:
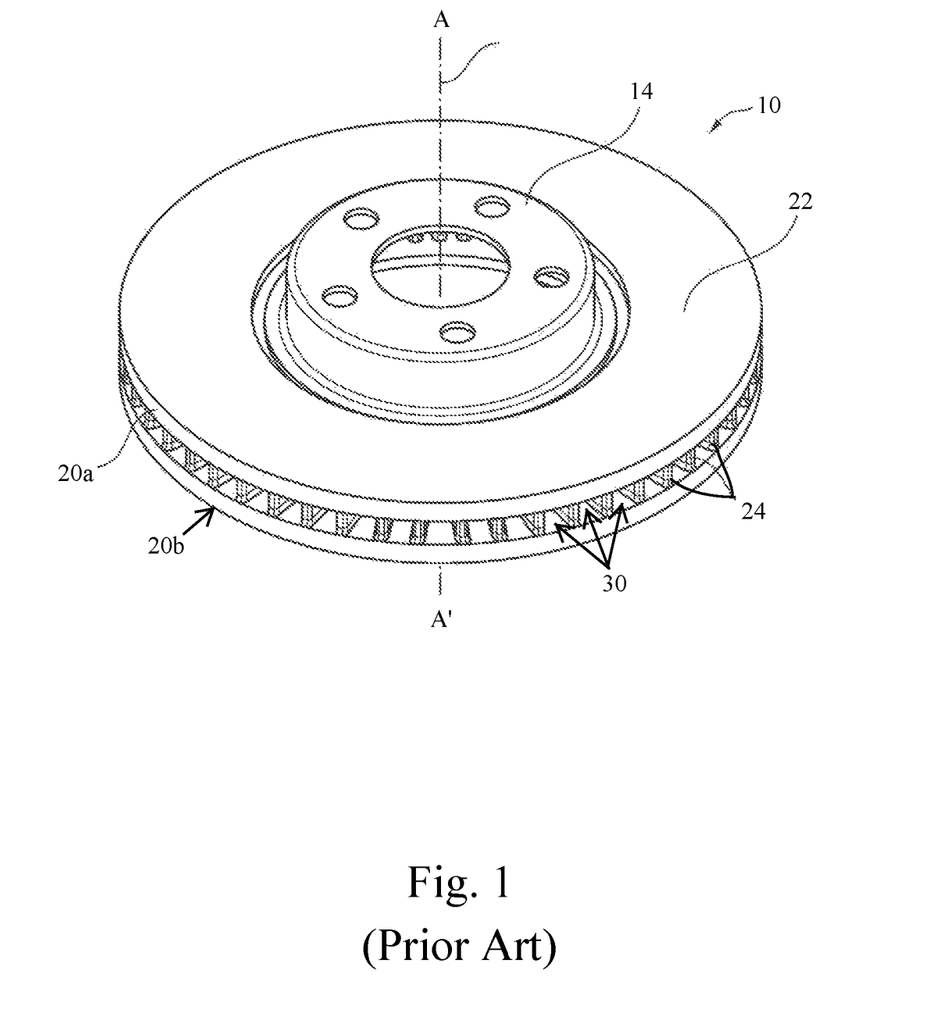
FIG. 1 illustrates one embodiment of a prior art brake rotor.

FIG. 1 shows an exemplary prior art brake disk rotor 10. As shown the rotor 10 is ventilated rotor having air channels between two spaced friction rings 20a, 20b. The rotor 10 includes a center portion or 'center hat' 14 having a plurality, for example five, fastening through-holes 18 for attaching the rotor to a wheel/hub of a vehicle. The friction rings 20a, 20b attach to the center hat 14. Connection between the center hat 14 and friction rings 20a, 20b may be made in various manners (e.g., integrally formed, bolted, etc.) as understood by those skilled in the art. As shown, the rotor 10 includes an upper friction ring 20a and a lower friction ring 20b (hereafter friction ring '20' unless specifically referenced) disposed about a common rotational axis A-A'. Each friction ring 20 has an outer planar annular surface 22, which is configured for engagement by braking pads held by a caliper when in use (not shown). The friction rings 20 are spaced apart such that their inner surfaces face one another. Extending between the inner surfaces of the friction rings are a plurality of vanes 24. The vanes 24, in conjunction with the inside surfaces of the friction rings 20 form air gaps or air channels 30 through which cooling air may pass.

Figure 2A:
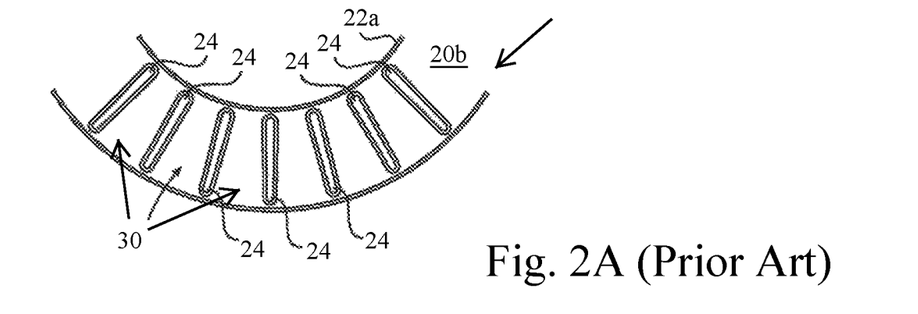
FIGS. 2A-2C illustrate various embodiments of prior art vanes and pillars utilized with a brake rotor.
Figure 2B:
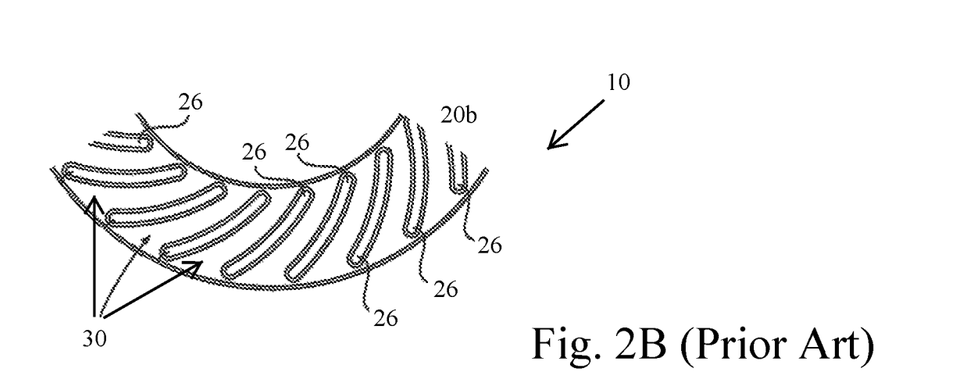
Figure 2C:
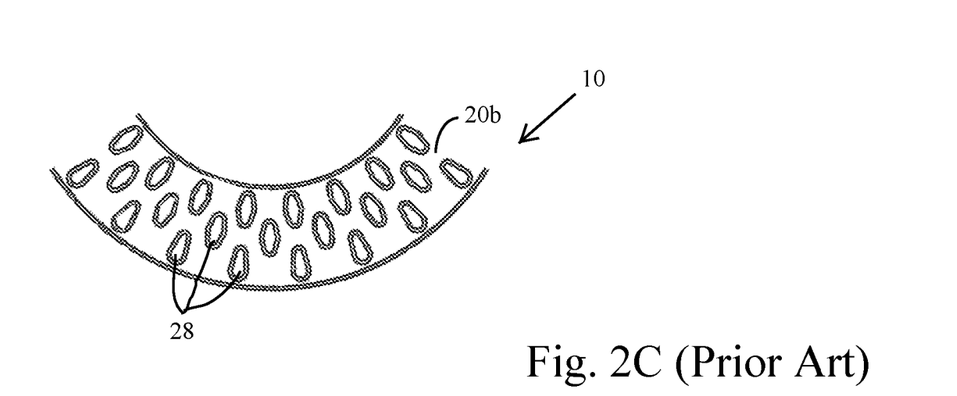

FIGS. 2A-2C illustrate various embodiments of vanes and pillars utilized with brake rotors. In each of these figures, the upper friction ring has been removed to show exemplary configurations of the vanes and pillars. As shown in FIG. 2A, the rotor 10 utilizes a plurality of vanes 24 that are straight and extend radially outward from a centerline axis of the rotor. In the illustrated embodiment, the vanes 24 extend from a location proximate to an inside periphery 22a of the friction ring 20b to a location proximate to an outside periphery 22b of the friction ring 20b. Spaces between the vanes 24 and inside surfaces of the upper and lower friction rings define air gaps or air channels. The embodiment of FIG. 2B illustrates the use of curved vanes 26. Use of curved vanes provides a significant benefit for a ventilated brake rotor. Specifically, the curved vanes 26, when rotated, function similar to a centrifugal impellor gathering air and passing the air through the air channels defined between the curved vanes 26 and friction rings. That is, the curved configuration of the vanes 26 works to 'pump' air through the air channels facilitating cooling. However, when utilizing such curved vanes, the rotor is left and right hand specific for a vehicle. FIG. 2C illustrates a plurality of pillars 28 that extend between inside surfaces of the friction rings to define an air channels between the friction rings.

The total surface area available for cooling of a ventilated brake rotor is the combined surface area of the outer annular surfaces of the upper and lower friction rings, the combined total surface area of all of the air channels defined by the inside surfaces of the friction rings and the surfaces of the vanes and/or pillars, and the combined area of the inner and outer peripheral edges of the rotor. As previously discussed, prior methods utilizing sand molds to define the air channels (i.e., during casting) limits the configuration and size of the vanes or pillars that can be formed. This limitation likewise limits the total surface area available for cooling. In some high-performance application (e.g., Formula racing), efforts have been made to drill cooling holes in a solid disc (e.g., carbon fiber disc) to reduce weight. In such application hundreds or thousands of holes may be drilled between opposing surfaces of a solid disc to provide cooling channels. Such a process is cost prohibitive for use with metal rotors and cannot provide curved vanes, which as previously noted, provide enhanced airflow similar to a centrifugal pump.

Figure 3A:
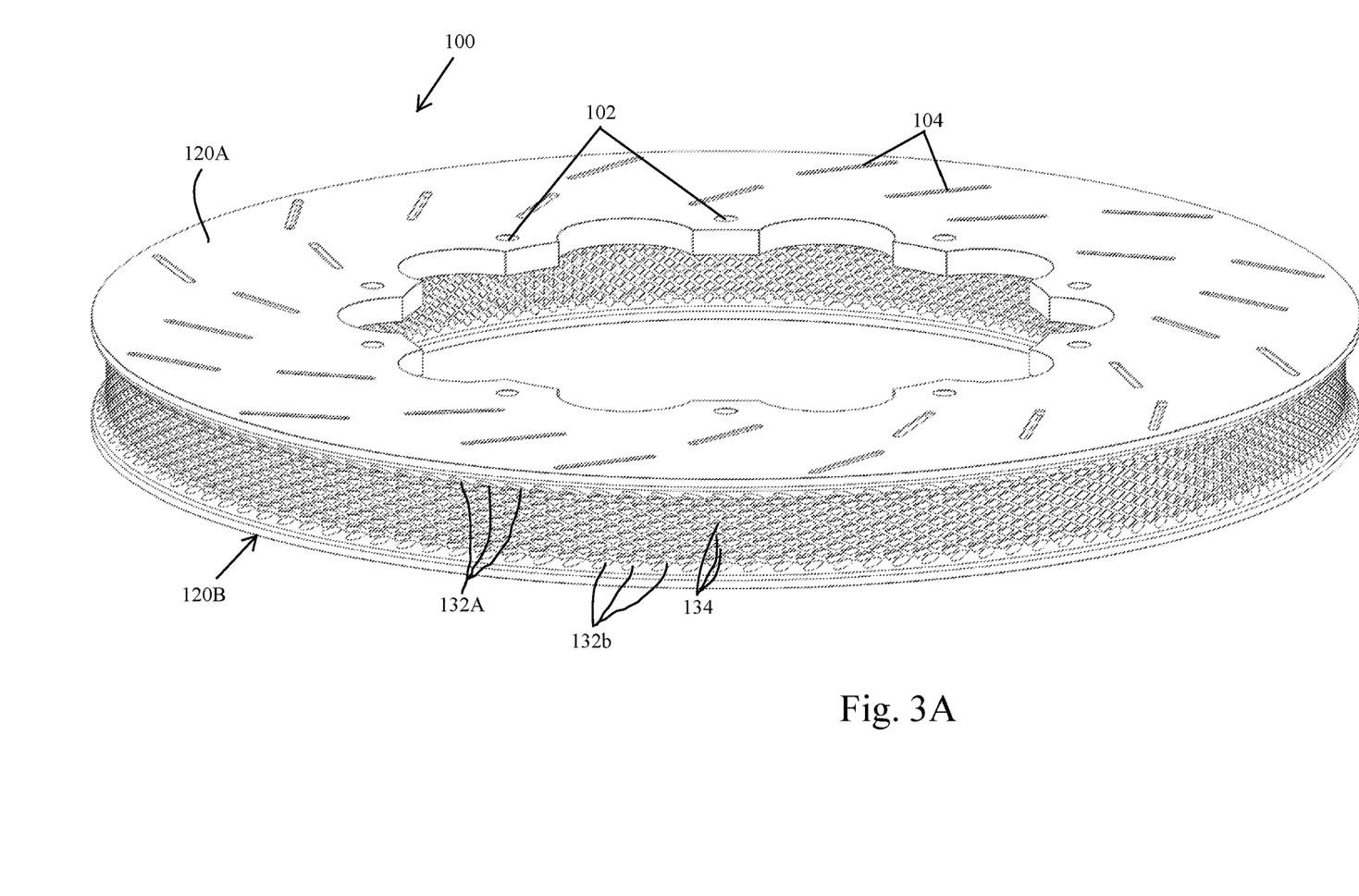
FIG. 3A illustrates one embodiment of a brake rotor in accordance with the present disclosure.
Figure 3B:
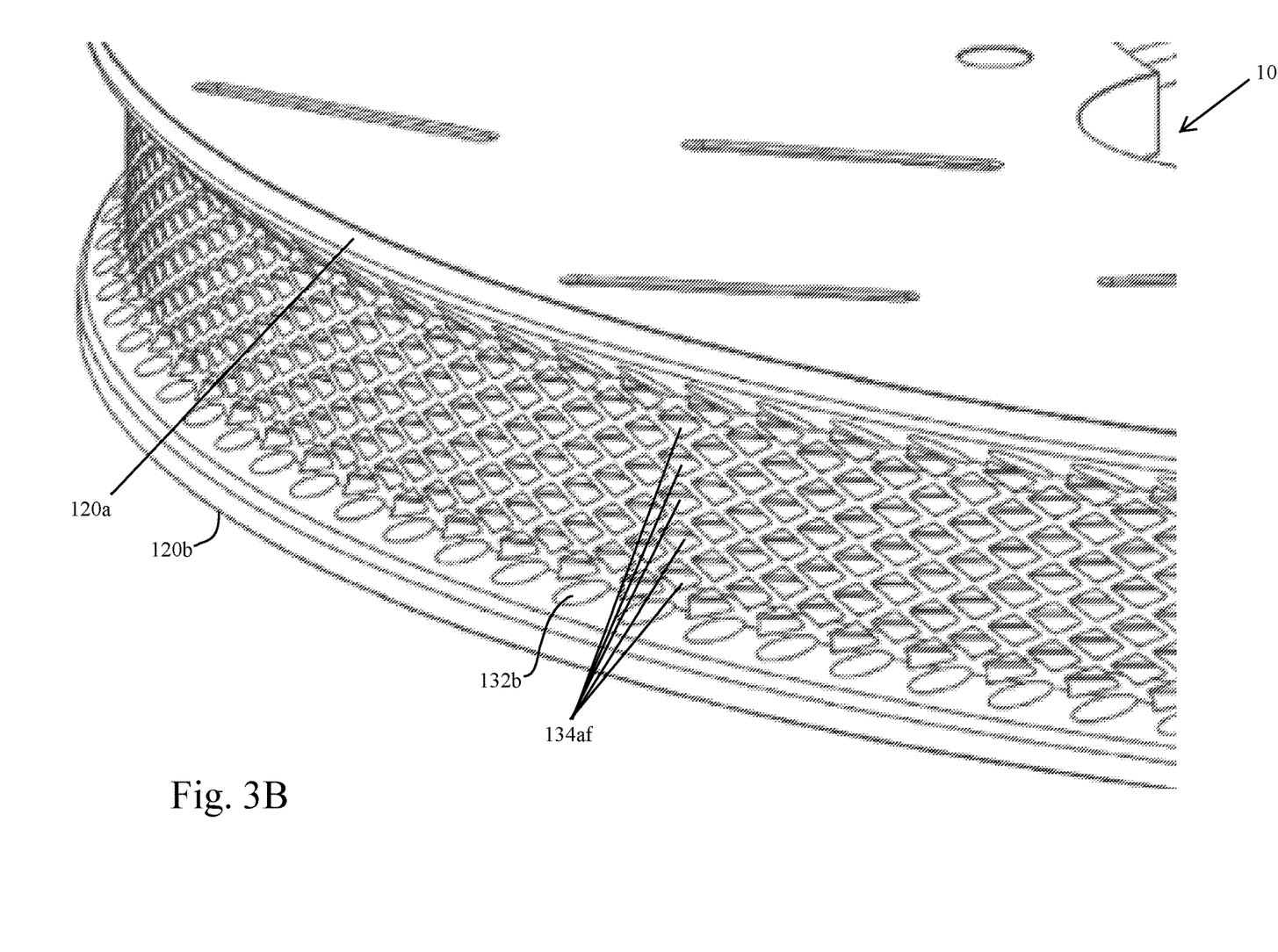
FIG. 3B illustrates an outside peripheral edge of the brake rotor of FIG. 3A.
Figure 3C:
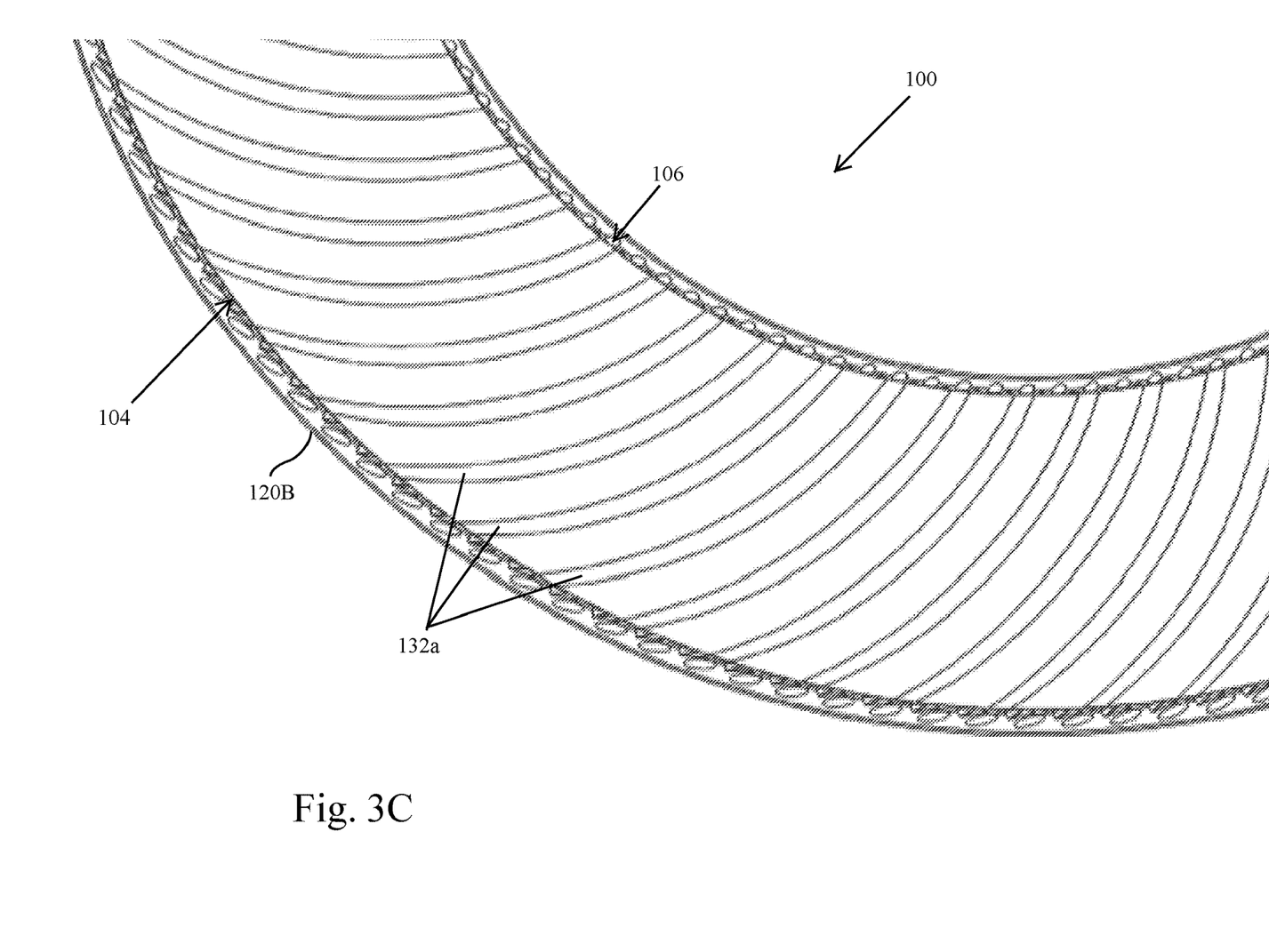
FIG. 3C illustrates a first partial cross-section of the brake rotor of FIG. 3A.

FIGS. 3A-3C illustrate one embodiment of a brake rotor 100 that provides increased cooling surface area in accordance with the present disclosure. More specifically, the brake rotor 100 includes a high-density cooling channel geometry that greatly increases the overall cooling surface are of the rotor 100. As shown, the brake rotor 100 shares many features in common with the prior art brake rotor 10 of FIG. 1 though the rotor 100 is shown without the center hat or integrated hub/center section. However, the rotor 100 includes a plurality of apertures 102 allowing connection of the rotor to a center hat or directly to the hub of a vehicle. As illustrated, the rotor 100 includes an upper friction ring 120a and a lower friction ring 120b (hereafter 120 unless specifically referenced) that are spaced relative to one another. Each of the friction rings 120 includes a generally planar and generally annular surface 122 (only one shown) configured to be contacted by brake pads held by a caliber (not shown). The term annular is meant to denote a generally ring-shaped configuration having an internal opening. However, the term annular does not require that the annular rings necessarily be circular on their inside or outside periphery. As above, the friction rings are disposed about a common axis of rotation A-A' and are spaced apart along the axis. In the illustrated embodiment, the annular surface 122 includes a plurality of optional recessed slots 104. Such recesses may be provided for, among other things, brake-pad outgassing, dust control and wet weather gripping. The configuration and orientation of such slots may be varied in shape, size, and/or quantity.

Disposed in the space between the upper friction ring 120a and the lower friction ring 120b is a lattice or matrix of cooling channels. As best shown in FIG. 3B, the illustrated embodiment of the matrix of cooling channels includes an upper and lower circular (i.e., in cross-section) cooling channels 132a, 132b spaced about the periphery of the brake rotor. Typically, for purposes of balance, the cooling channels are spaced evenly or in a repeating pattern about the periphery of the brake rotor. The circular cooling channels 132a, 132b are formed within the brake rotor adjacent to the inside surfaces of the upper and lower friction rings 120a, 120b, respectively. Stated otherwise, the cooling channels are disposed between the outside surfaces of the friction rings. In the illustrated embodiment, repeating rows or stacks of diamond-shaped (i.e., in cross-section) cooling channels 134a-f (hereafter 134 unless specifically referenced) are disposed between the circular cooling channels. These stacks or rows of diamond shaped cooling channels are likewise disposed about the periphery of the brake rotor evenly or in an evenly repeating pattern (i.e., for balance purposes). The number of rows and configuration of these cooing channels may be varied. The inclusion of such a large number of cooling channels significantly increases the overall surface area of the brake rotor for cooling as well as enhances the structural properties of the rotor. That is, the matrix structure results in a brake rotor having significantly improved compressive strength compared to prior art rotors. This allows, among other things, positioning cooling channels closer to the surface of the friction rings, as is further discussed herein.

FIG. 3C illustrates a partial cross-sectional view of the brake rotor 100 with the upper friction ring 120a removed to show the upper circular cooling channels 132a. As shown, each cooling channel 132a extends in a path between an outside peripheral edge 104 of the brake rotor 100 and inside peripheral edge 106 of the brake rotor 100. Typically, the path of each cooling channel is disposed in a plane that is substantially perpendicular to the common axis of the rotor. However, this is not a strict requirement. Though discussed as being arcuate between the inside and outside periphery, it should be noted that other configurations are possible and within the scope of the present disclosure. For instance, the cooling channels may be linear and/or have non-uniform cross-sections along their length. Nonetheless, it may be desirable that the channels 132 be arcuate to provide a centrifugal pumping effect to move air from the inside periphery of the rotor to the outside periphery the rotor when the rotor is rotating. As these sets of channels 132a, 132b (hereafter 132 unless specifically referenced) are disposed against (e.g., adjacent to) the inside surfaces of the friction rings 120, these channels 132 are considered the outside or outer cooling channels of the matrix of cooling channels.

Figure 3D:
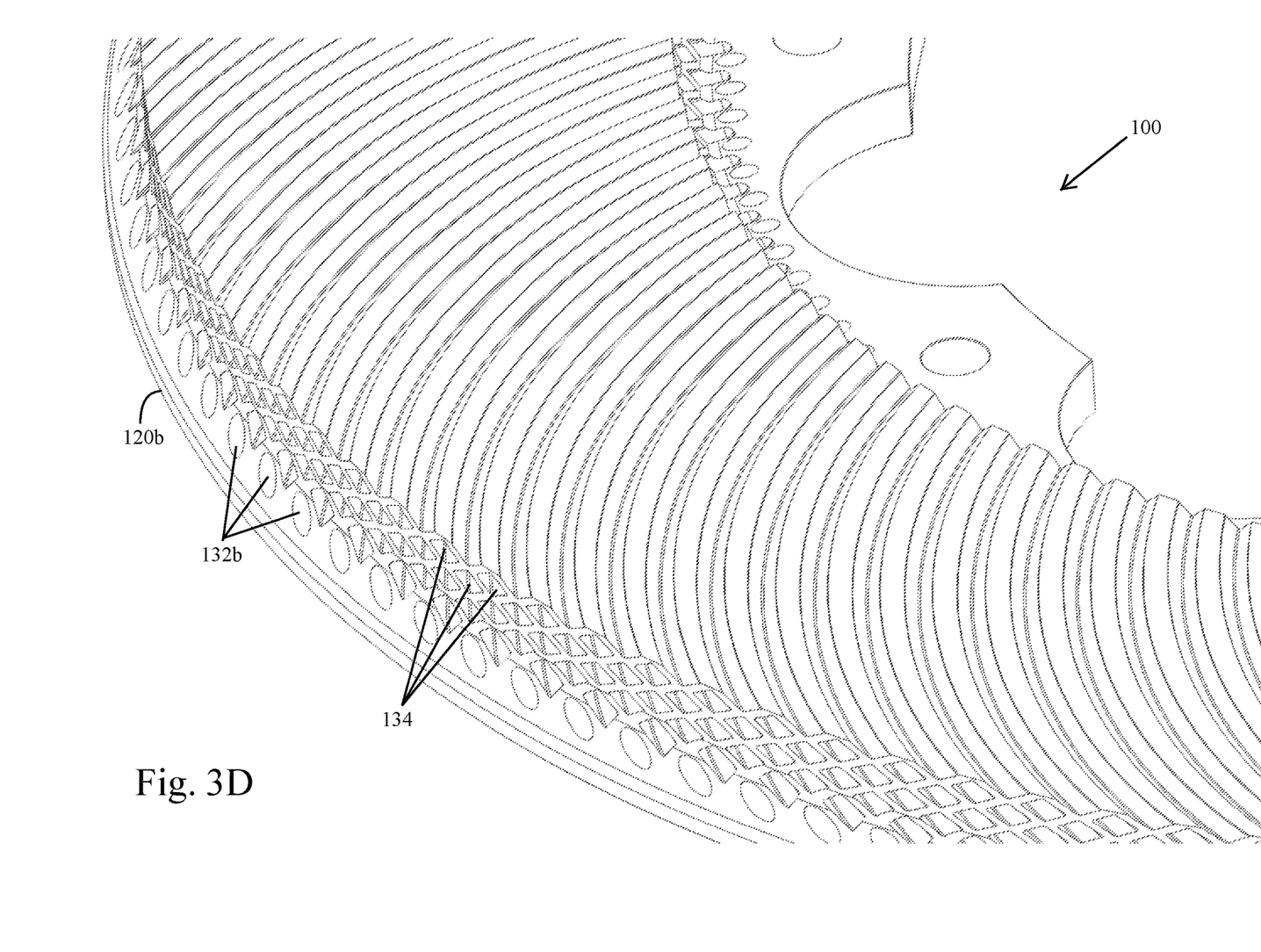
FIG. 3D illustrates a second partial cross-section of the brake rotor of FIG. 3A.

FIG. 3D illustrates a cross-sectional view taken through a center of the rotor 100 to illustrate the interior cooling channels 134 of the brake rotor 100. Each of these interior cooling channels 134 is disposed between a cooling channel that is above or below the interior cooling channel. This regard, any specific interior cooling channel 134 may be disposed between an outer cooling channel 132 and another interior cooling channel 134 or may be disposed between two interior cooling channels 134. As with the outer cooling channels, the interior cooling channels each extend in a path between an outside peripheral edge 104 of the brake rotor 100 and inside peripheral edge 106 of the brake rotor 100. Most commonly, the path is in a plane that is substantially perpendicular to the common axis of the rotor. However, this is not a strict requirement.

Figure 3E:
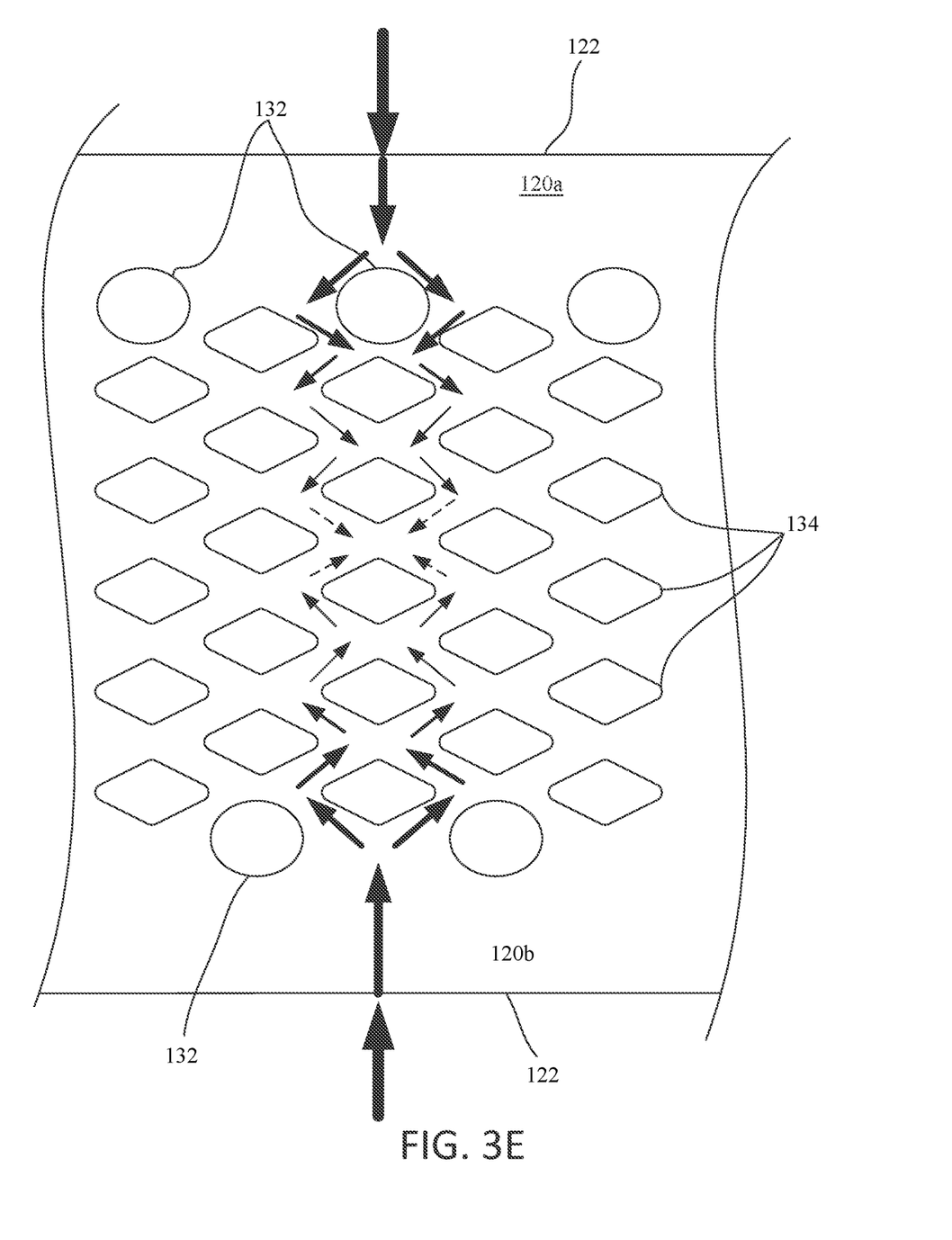
FIG. 3E illustrates thermal conduction through the brake rotor of FIG. 3A.

As shown in FIG. 3E, the sidewalls surrounding of the various cooling channels 132, 134 form an effective thermal pathway (i.e., as illustrated by the arrows) from the surfaces of the friction rings to the interior cooling channels. Stated otherwise, the sidewalls extend continuously from the planar surfaces of the friction rings into the interior of the matrix of cooling channels.

Figure 4A:
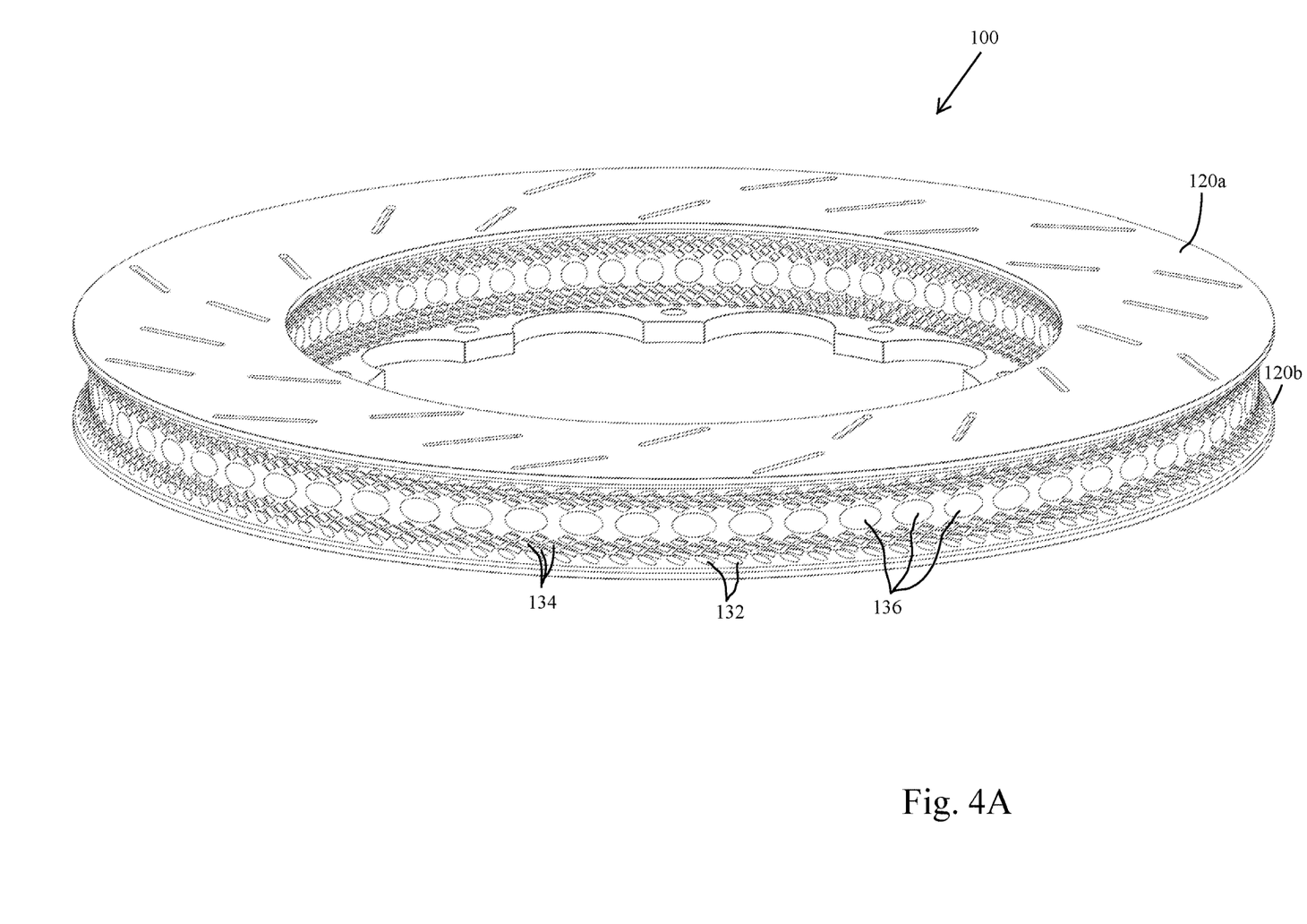
FIG. 4A illustrates another embodiment of a brake rotor in accordance with the present disclosure.
Figure 4B:
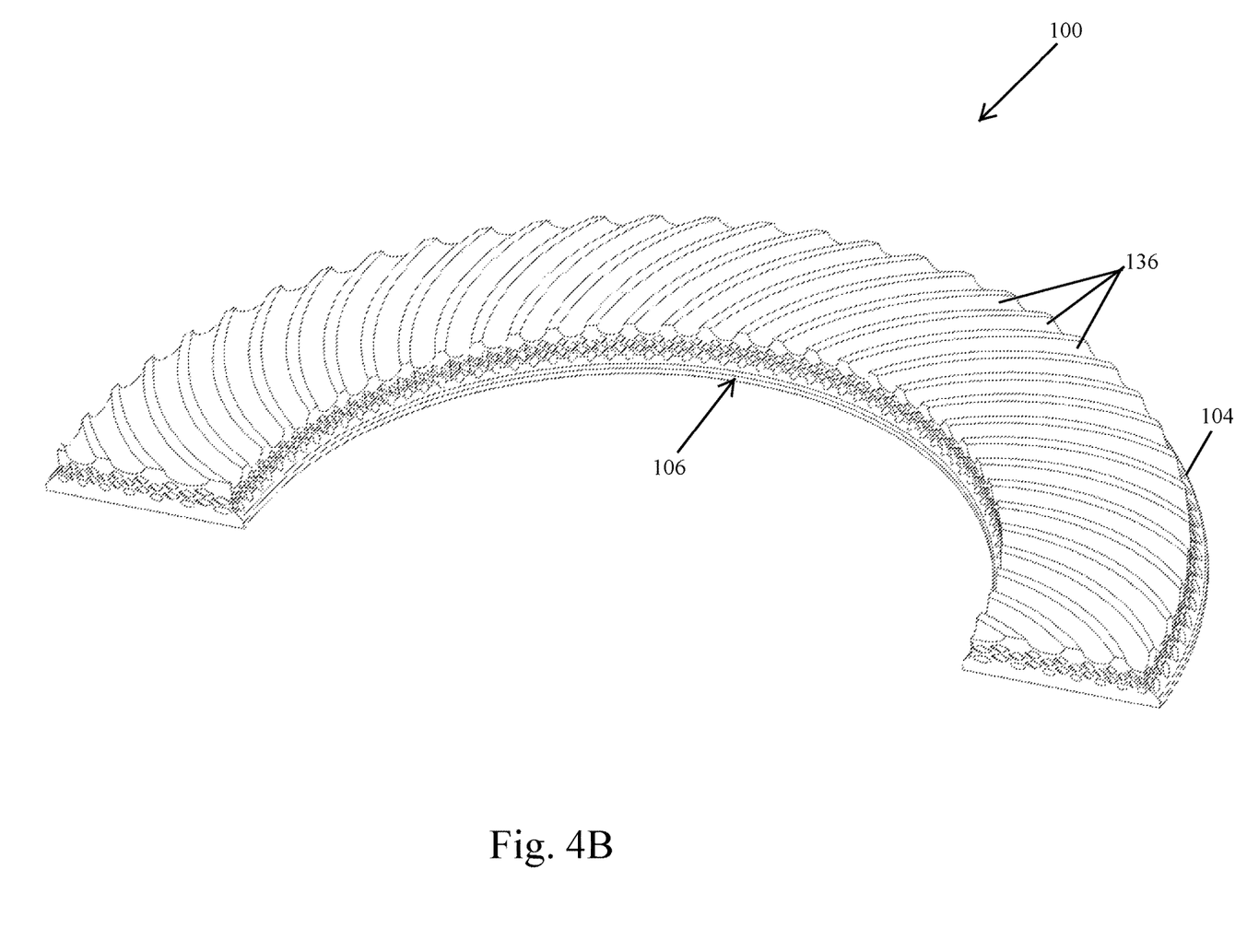
FIG. 4B illustrates a partial cross-section of the brake rotor of FIG. 4A.

Though discussed in relation to FIG. 3A-3E as utilizing circular and diamond-shaped cooling channels, it will be appreciated that such geometry is presented by way of example and not by limitation. That is, the geometric configuration (e.g., cross-sectional shape) of the various cooling channels may be varied. For instance, all of the channels in the matrix of cooling channels may be round, ovular, triangular, etc. That is, the outer and inner cooling channels may be identically configured (e.g., all having a round cross-section of the same diameter). Further, the size and configuration of the cooling channels may be varied. By way of example, FIGS. 4A and 4B illustrates an alternate embodiment of a brake rotor 100 having a combination of circular outer cooling channels 132, diamond-shaped interior cooling channels 134 adjacent to each set of outer cooling channels 132 and a set of circular central cooling channels

136. As show, the central cooling channels 136 have a significantly increased diameter in relation to either of the other sets of cooling channels.

Importantly for each of the disclosed embodiments is the overall increase in the available surface area for cooling. By way of example, an original manufacturer equipment (OEM) rotor for the Dodge Challenger Hellcat has a vane configuration similar to the configuration illustrated in FIGS. 1 and 2B. The combined surface area of the OEM Hellcat cast iron rotor (i.e., combined surface area of the outer surfaces of the friction rings plus the combined total surface area of all the air channels defined by the inside surfaces of the friction rings and the surfaces of the vanes) is approximately 3,600 square centimeters ($cm^2$). The combined surface area of the brake rotor 100 of the embodiment of FIGS. 3A-3E for a rotor having an identical configuration (e.g., the same inside and outside diameters) as the OEM Hellcat rotor is approximately 14300 $cm^2$. The combined surface area of the brake rotor of the embodiment of FIGS. 4A and 4B for a rotor having the same configuration as the OEM Hellcat rotor is approximately 13900 $cm^2$. In either embodiment, the surface area of the interior channel/matrix channel rotors increases between 3.5 and 4 times the surface area of the OEM rotor. Accordingly, the interior channel/matrix rotor permits enhanced heat dissipation to the greatly increased surface area for cooling.

The ability to form the interior channels having non-linear shapes and/or varying sizes is provided by the ability to three-dimensionally print the matrix channel rotors. That is, while it may be possible to drill thousands of straight cooling channels in a solid rotor, there is no way to form the matrix channels having an arcuate configuration or other non-linear configuration in a drilling process. Likewise, such a matrix of arcuate cooling channels cannot be formed in a casting process. As known by those skilled in the art, a 3D printing process builds a three-dimensional object such as the matrix rotor from a computer-aided design (CAD) model, by successively adding material layer by layer. This process is also referred to as additive manufacturing. This in contrast to conventional machining, casting and forging processes utilized to form brake rotors, where material is removed from a stock item (subtractive manufacturing) or poured into a mold and shaped by means of dies, presses and milling. 3D metal printing processes suitable for forming the matrix rotor include, without limitation direct metal laser sintering, laser powder bed fusion, and electron beam melting to name a few.

Figure 3F:
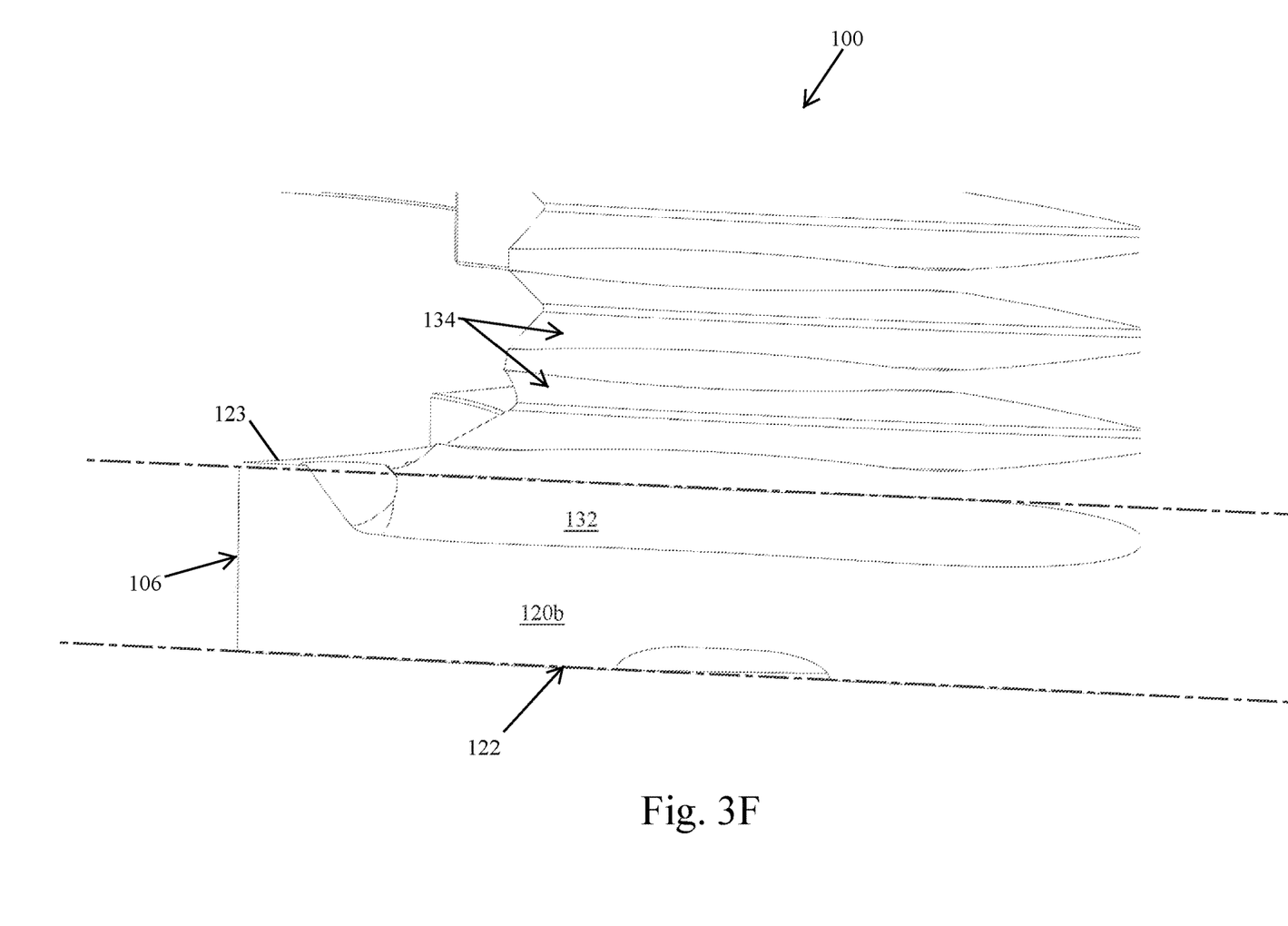
FIG. 3F illustrates a cross-sectional view of an outer cooling channel.

FIG. 3F illustrates another configuration of the cooling channels made possible by 3D printing. As shown, FIG. 3F is a partial cross-section of the rotor 100 of FIG. 3B taken along a radial line (not shown) extending from the common axis of the rotor. This figure illustrates the lower friction ring 120*b*. As shown, the lower friction ring has a planar outside surface 122. In addition, the lower friction ring 120*b* has what may be termed an inside surface 123. Previously, most friction rings had such planar outside and inside surfaces and any structure of vanes was formed between the planar inside surfaces of two spaced friction rings. The ability to 3D print the brake rotor allows for the various cooling channels to be formed as recesses in the inside surface of the friction rings. For instance, outer cooling channel 132 take a non-linear path. As illustrated, the outer cooling channel 132 opens through the inside surface 123 of the lower friction ring 102*b* near its inside peripheral edge 106. The cooling channel then turn and extend below the inside surface of the lower friction ring 102*b*. This cooling channel may exit at the outer peripheral edge in a similar manner (not shown). This results in thinning the distance between the outside surface 122 of the rotor where heat is generated by brake pads and the cooling channels 132 (only one shown). Such thinning of the friction ring is permissible in the matrix rotor due to the structure provided by the matrix. Further, the ability to form recessed cooling channel in the inside surface of one or both friction rings may permit the generation of symmetrical cooling channels for rotors have non-symmetric friction rings. As shown in FIG. 3A, the upper friction ring includes the mounting apertures 102 on the upper friction ring. Previously, this structure on the inside periphery of the upper friction ring prevented forming symmetrical cooling channels near the surface of one of the friction rings.

Additional performance benefits of the matrix rotor may be achieved based on the materials utilized to form the rotor. More specifically, the inventors have determined that weight and/or thermal benefit may be achieved by forming the rotor of a metal matrix composite (MMC). A MMC is a composite material having at least two constituent parts, one metal and at least one additional material. In an embodiment, the rotor is formed of an MMC comprising aluminum and ceramic. In a preferred embodiment, the rotor is formed from an aluminum and ceramic printable MMC that comprises 5-25% ceramic. One manufacturer of such an MMC material is Elementum 3D of Erie, Colo. Suitable 3D printable products available from Elementum 3D include, without limitation, A1000-RAM10 and or A2024-RAM10 printable materials. When utilizing the aluminum ceramic material, the overall weight of the matrix rotor may be drastically reduced compared to a correspondingly sized cast iron rotor. Additionally, the inclusion of the ceramic material allows for increasing the solidus temperature to approximately 660 C far higher that standard aluminum, this enables a higher rotor operating temperature thus allowing the extraction of more heat energy. Returning to the above example for the Dodge Challenger Hellcat, the OEM cast iron rotor has a mass of approximately 29.8 lbs. (i.e., 13540 grams). The mass of the brake rotor 100 of the embodiment of FIGS. 3A-3E for a rotor having an identical configuration (e.g., the same inside and outside diameters) as the OEM Hellcat rotor is approximately 9.0 lbs. (4070 grams). The mass of the brake rotor of the embodiment of FIGS. 4A and 4B for a rotor having the same configuration as the OEM Hellcat rotor is approximately 10.5 lbs. (4788 grams). In either embodiment, mass of the 3D printed rotor is approximately one third of the OEM rotor. As will be appreciated, for a vehicle having four disc brakes, this results in significant weight savings. More importantly for high performance (e.g., racing) applications, this weight is unsprung weight (i.e., weight not supported by the suspension) as well as rotational mass. The reduction of unsprung weight and rotational mass improves acceleration and handling characteristics (by reducing inertia within the unsprung suspension).

Figure 5A:
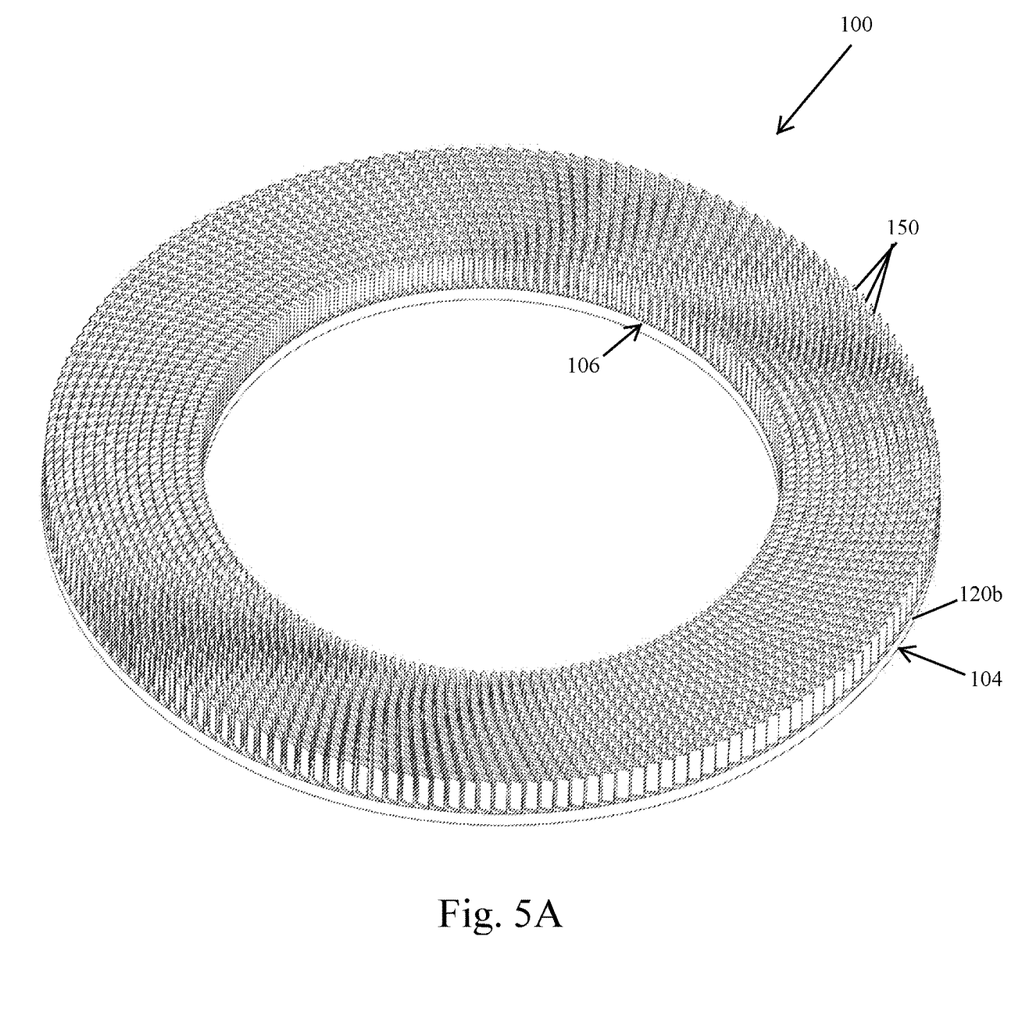
FIG. 5A illustrates yet another embodiment of a brake rotor in accordance with the present disclosure.
Figure 5B:
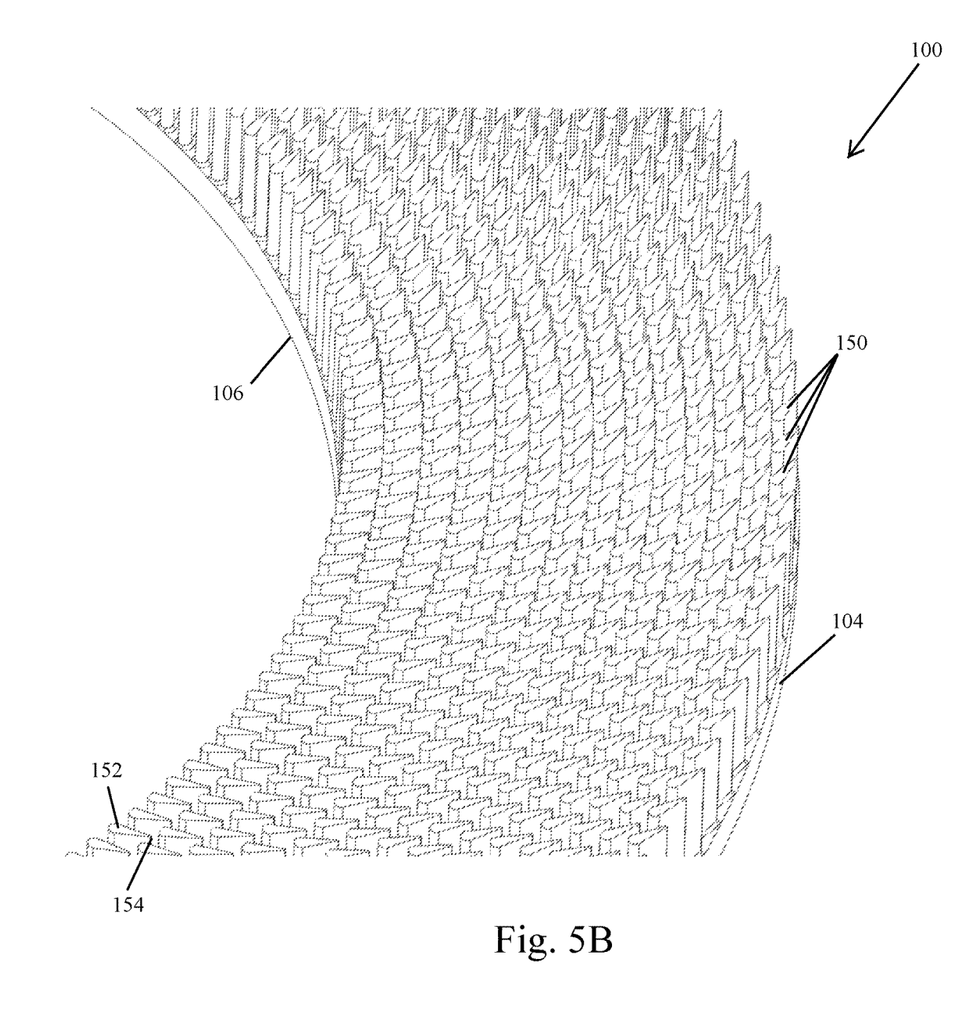
FIG. 5B is a close up of a portion of FIG. 5A.

While the previous discussion has been focused on a brake rotor having a matrix of cooling channels, 3D metal printing facilitates the production of other rotor designs that may provide improved cooling and/or weight reduction. FIGS. 5A and 5B illustrate one embodiment of a pillar-type brake rotor 100 that may be produced in a 3D printing process. As illustrated, an upper friction ring has been removed from both figures for discussion. As shown, the rotor 100 has a plurality of tear-drop shaped pillars 150 that extend between a lower friction ring 120*b* and an upper friction ring (not shown). Each tear-drop shaped pillar 150 has a bulbous leading edge or head and a pointed trailing end or tail 152. The tear-drop shaped pillars 152 are arranged in multiple sweeping rows about the periphery of the friction rings. These rows of pillars 150 typically extend from an insider peripheral edge 106 of the friction rings 120 to an outside peripheral edge 104 of the friction rings 120.

The tear-drop shaped pillars may be disposed in concentric rows such that each inner row of tear-drop shaped pillars direct airflow to the adjected outer row of tear-drop shaped pillars. As illustrated, the long axes (i.e., between the front center of the head through the tail) of the tear-drop shaped pillars may be swept or turned (e.g., concentric row by concentric row) to provide an equivalent to the curved vanes discussed above. That is, an angle of turn between the long axes of each pillar in a single concentric row will be the same relative to a radial reference axis (not shown) extending from a common axis of the rotor at a common point on each pillar (e.g., at the tip of the tail). In this regard, the curvature defined by the multiple rows of tear-drop pillars may provide a cooling channel curvature that generates centrifugal forces that allow moving the air through the pillars 150 to the outer periphery 104 of the rotor 100.

The use of the tear-drop shape for the pillars reduces turbulence of the air passing through the inside of the rotor 100. This results in an increase in the volume of air that passes through the rotor. Previously, efforts have been made in rotor designs to enhance turbulent air flow to increase heat transfer/cooling. The presented design achieves higher heat transfer by utilizing an increased density of pillars than was previously possible in sand casting type processes. Further, to enhance heat transfer, it is preferable that the tail 154 of any inner pillar 150 is disposed between the head of two outer pillars 150. In such an arrangement, air passing over a leading pillar is split by its bulbous head 152 and directed onto the leading edge/head of two downstream or outer pillars 150. This increases the heat transfer form the head of each pillar enhancing the cooling effect of the pillars.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. For example, the size of the teardrop, the relative spacing and density all are reasonable variations depending on the design and heat transfer goals. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. A ventilated brake rotor comprising:
   first and second annular friction rings having a common axis of rotation, the first and second friction rings having first and second generally planer outer surfaces, respectively, that are parallel and spaced apart along the common axis;
   a first set of individual outer cooling channels disposed between the first and second planer surfaces of the first and second annular friction rings wherein the first set of individual outer cooling channels are disposed adjacent to the first annular friction ring about a periphery of the rotor in a first plane that is substantially perpendicular to the common axis;
   a second set of individual outer cooling channels disposed between the first and second planer surfaces of the first and second annular friction rings, wherein the second set of individual outer cooling channels are disposed adjacent to the second annular friction ring about a periphery of the rotor in a second plane that is substantially perpendicular to the common axis; and
   at least a first set of individual inner cooling channels disposed in a third plane between the first plane of the first set of individual outer cooling channels and the second plane of the second set of individual outer cooling channels, wherein the first set of inner cooling channels is disposed about the periphery of the rotor and are separated from the first and second annular friction rings by the first set of individual outer cooling channels and the second set of individual outer cooling channels, respectively.

2. The brake rotor of claim 1, wherein each of the individual outer cooling channels and each of the individual inner cooling channels each extend through the rotor between an outside peripheral edge of the rotor and an inside peripheral edge of the rotor.

3. The brake rotor of claim 2, wherein each individual cooling channel forms an opening though the rotor in a plane that is substantially perpendicular to the common axis of the rotor.

4. The brake rotor of claim 2, wherein at least a portion of the individual outer cooling channels or individual inner cooling channels have an arcuate path between the outside peripheral edge of the rotor and the inside peripheral edge of the rotor.

5. The brake rotor of claim 1, wherein the first set of individual inner cooling channels comprises: a plurality of cooling channels disposed in a matrix between the first and second sets of individual outer cooling channels.

6. The brake rotor of claim 5, wherein the matrix includes at least two stacked rows of cooling channels disposed about the periphery of the rotor.

7. The brake rotor of claim 5, wherein a cross-section shape or a cross-section dimension of at least a first portion of the plurality of cooling channels differs from a cross-sectional shape or cross-sectional dimension a second portion of the plurality of cooling channels.

8. The brake rotor of claim 1, wherein a cross-section shape or a cross-section dimension of the individual outer cooling channels differs from a cross-sectional shape or cross-sectional dimension of the individual inner cooling channels.

9. The brake rotor of claim 1, wherein the brake rotor is formed of a printed metal matric composite (MMC).

10. The brake rotor of claim 1, wherein the MMC comprises aluminum and 5-25%, by weight, of ceramic powder.

11. The brake rotor of claim 1, wherein each individual cooling channel is a separate channel fluidly isolated from other channels along its length.

12. A ventilated brake rotor comprising:
    first and second annular friction rings having a common axis of rotation, the first and second friction rings having first and second generally planer outer surfaces, respectively, that are parallel and spaced apart along the common axis; and
    a matrix of cooling channels disposed between the first and second planer surfaces of the first and second annular friction rings wherein the matrix of cooling channels are disposed about a periphery of the rotor, the matrix comprising:

a first set of individual cooling channels disposed in a first plane that is substantially parallel to the first and second planar surfaces;

a second set of individual cooling channels disposed in a second plane that is substantially parallel to the first and planar surfaces; and a third set of individual cooling channels disposed in a third plane between the first plane and the second plane, wherein the third set of individual cooling channels are separated from the first and second set of annular friction rings by the first set of individual cooling channels and the second set of individual cooling channels, respectively.

13. The brake disc of claim 12, wherein each cooling channel of the matrix of cooling channels extend through the rotor between an outside peripheral edge of the rotor and an inside peripheral edge of the rotor.

14. The brake rotor of claim 13, wherein each cooling channel of the matrix of cooling channel forms an opening though the rotor in a plane that is substantially perpendicular to the common axis of the rotor.

15. The brake rotor of claim 13, wherein each cooling channel has non-linear path between the outside peripheral edge of the rotor and the inside peripheral edge of the rotor.

16. The brake rotor of claim 13, wherein a cross-section shape or a cross-section dimension of at least a first portion of the matrix of cooling channels differs from a cross-sectional shape or cross-sectional dimension a second portion of the matrix of cooling channels.

17. The brake rotor of claim 13, wherein each individual cooling channel is a separate channel fluidly isolated from other channels along its length.

* * * * *